US012584605B2

(12) United States Patent
Jeong

(10) Patent No.: US 12,584,605 B2
(45) Date of Patent: Mar. 24, 2026

(54) LAMP FOR VEHICLE

(71) Applicant: HYUNDAI MOBIS CO., LTD., Seoul (KR)

(72) Inventor: Seok Ho Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/593,153

(22) Filed: Mar. 1, 2024

(65) Prior Publication Data

US 2025/0052400 A1 Feb. 13, 2025

(30) Foreign Application Priority Data

Aug. 8, 2023 (KR) ........................ 10-2023-0103773

(51) Int. Cl.
*F21S 43/245* (2018.01)
*F21S 43/237* (2018.01)

(52) U.S. Cl.
CPC ........... *F21S 43/245* (2018.01); *F21S 43/237* (2018.01)

(58) Field of Classification Search
CPC .............................. F21S 43/245; F21S 43/237
See application file for complete search history.

(56) References Cited

U.S. PATENT DOCUMENTS

2002/0131275 A1* 9/2002 Yamamoto .............. F21S 9/035 362/555
2005/0111235 A1* 5/2005 Suzuki .................. F21V 7/0091 362/555
2014/0254186 A1* 9/2014 Terai ...................... B60Q 1/304 362/487
2022/0120402 A1* 4/2022 Woodgate ............. F21S 41/645

FOREIGN PATENT DOCUMENTS

CN 106030201 A * 10/2016 .............. F21V 7/048

* cited by examiner

*Primary Examiner* — Abdulmajeed Aziz
*Assistant Examiner* — Jessica M Apenteng
(74) *Attorney, Agent, or Firm* — NSIP Law

(57) ABSTRACT

A lamp for a vehicle is provided. The lamp includes: a light source part; and a light guide part to guide the light input from the light source part and output the light. The light guide part includes: a guide body, to which the light irradiated from the light source part is input; an input surface, to which the light provided on one side of the guide body is input; a reflective surface to reflect the light in a forward direction; an output surface being a surface of an outer surface of the guide body, except for the input surface and the reflective surface, and being a surface to output the light; and a 3-dimensional light forming pattern formed in the guide body, and reflecting the light input to the guide body in a different direction from a direction of the light reflected by the reflective surface.

12 Claims, 23 Drawing Sheets

LAMP FOR VEHICLE

CROSS-REFERENCE TO RELATED APPLICATION(S)

This application claims the benefit under 35 U.S.C. § 119 to Korean Patent Application No. 10-2023-0103773, filed in the Korean Intellectual Property Office on Aug. 8, 2023, the entire contents of which are incorporated herein by reference for all purposes.

BACKGROUND

1. Field

The present disclosure relates to a lamp. More particularly, the present disclosure relates to a lamp for a vehicle.

2. Description of Related Art

In general, vehicles include various types of lamps that have a lighting function for helping easily identify objects located around the vehicles during driving at night and a signaling function for informing other vehicles or road users of driving states of the vehicles.

Recently, lamps for a vehicle have been developed in various forms to enhance aesthetics of an external appearance of the vehicle depending on needs of users who value design. In particular, recently, light guides that show an indirect lighting effect by reflecting light received from a light source while not directly exposing the light source have been widely applied to vehicles. The light guide is mainly coupled to a front edge of a bezel of a headlamp provided in a forward direction of the vehicle to improve aesthetics of the external appearance of the vehicle.

Because a conventional light guide guides most of the light only in the forward direction by using a cut that is formed in a rearward direction, they can only implement two-dimensional light emission images whereby it is difficult to freely implement light emission images or three-dimensional images. Therefore, there is a need to improve technology to implement various light emission images through light guides.

SUMMARY

The present disclosure has been made to solve the above-mentioned problems occurring in the prior art while advantages achieved by the prior art are maintained intact.

An aspect of the present disclosure provides a lamp for a vehicle that implements a light emission image having a three-dimensional effect by also irradiating light in an additional direction, in addition to a direction of irradiation of light by a reflective surface.

The technical problems to be solved by the present disclosure are not limited to the aforementioned problems, and any other technical problems not mentioned herein will be clearly understood from the following description by those skilled in the art to which the present disclosure pertains.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A general aspect of the disclosure, a lamp for a vehicle includes: a light source part configured to emit light; and a light guide part configured to guide the light input from the light source part and output the light, wherein the light guide part includes: a guide body, to which the light irradiated from the light source part is input; an input surface, to which the light provided on one side of the guide body is input; a reflective surface configured to reflect the light input to the guide body in a forward direction being an output direction; an output surface being a surface of an outer surface of the guide body, except for the input surface and the reflective surface, the output surface configured to output the light; and a 3-dimensional light forming pattern formed in the guide body, and wherein the 3-dimensional light forming pattern is formed to reflect the light input to the guide body in a different direction from a direction of the light reflected by the reflective surface.

The reflective surface may include a plurality of reflective optics configured to reflect the light input to an interior of the guide body in the forward direction, and the reflective optics may be repeatedly formed along main extension directions, in which the guide body extends.

When directions in which the guide body extends are defined as main extension directions, and a line obtained by extending a center of the guide body along the main extension directions is defined as a central axis, the 3-dimensional light forming pattern may include a plurality of unit optical patterns, wherein the unit optical pattern may be formed on the output surface to be concave, wherein the unit optical pattern may include an inclined guide surface formed to be inclined with respect to an imaginary plane being perpendicular to the central axis and is configured to reflect the light, and wherein the light reflected by the inclined guide surface may travel in a direction parallel to a direction perpendicular to a radial direction, a center of which is the central axis.

The plurality of unit optical patterns may be formed in the forward direction of the central axis, along the main extension directions to be spaced apart from each other, and the light reflected by the inclined guide surface may be reflected in a direction perpendicular to the forward direction and the main extension directions.

The plurality of unit optical patterns may be formed such that depths thereof in a direction facing the central axis are the same.

Adjacent ones of the plurality of unit optical patterns may be formed such that depths thereof in a direction facing the central axis are different.

The 3-dimensional light forming pattern may include a set of optical patterns repeatedly formed along the main extension directions, and the set of the optical patterns may include the plurality of unit optical patterns formed to be spaced apart from each other along a circumferential direction of the output surface.

Any one of the plurality of unit optical patterns may be formed in the forward direction of the central axis, and extend from the output surface to the reflective surface.

The reflective surface may include a first reflective surface formed to face a rearward direction being an opposite direction to the forward direction, and a second reflective surface formed to be inclined with respect to the first reflective surface, wherein the light guide part may further include a multi-light forming pattern, wherein the multi-light forming pattern may include a plurality of multi-pattern sets repeated along an extension direction of the guide body, and wherein the multi-pattern set may include a first unit multi-pattern formed on the first reflective surface, and a second unit multi-pattern formed on the second reflective surface.

The light guide part may further include a multi-light forming pattern, wherein the reflective surface may include a first reflective surface formed to face a rearward direction being an opposite direction to the forward direction, wherein the multi-light forming pattern may include a plurality of unit multi-patterns formed on the first reflective surface and spaced apart from each other along an extension direction of the guide body, and wherein adjacent ones of the plurality of first unit multi-patterns may be formed such that depths thereof in a direction facing a center of the guide body are different.

The 3-dimensional light forming pattern may include an outer lens, wherein a plurality of unit optical patterns may be arranged along the length of the guide body and configured to emit light toward the outer lens.

The light forming pattern may emit light externally through the outer lens.

The outer lens may include a cover for protecting internal components of the lamp.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail according to the accompanying drawings.

First, the embodiments that will be described below are suitable for helping to understand the technical features of a lamp for a vehicle, which is the present disclosure. However, the present disclosure is not limited to the embodiments described below or the technical features of the present disclosure are not limited by the described embodiments, and various modifications are possible within the technical scope of the present disclosure.

First Embodiment

Figure 1:
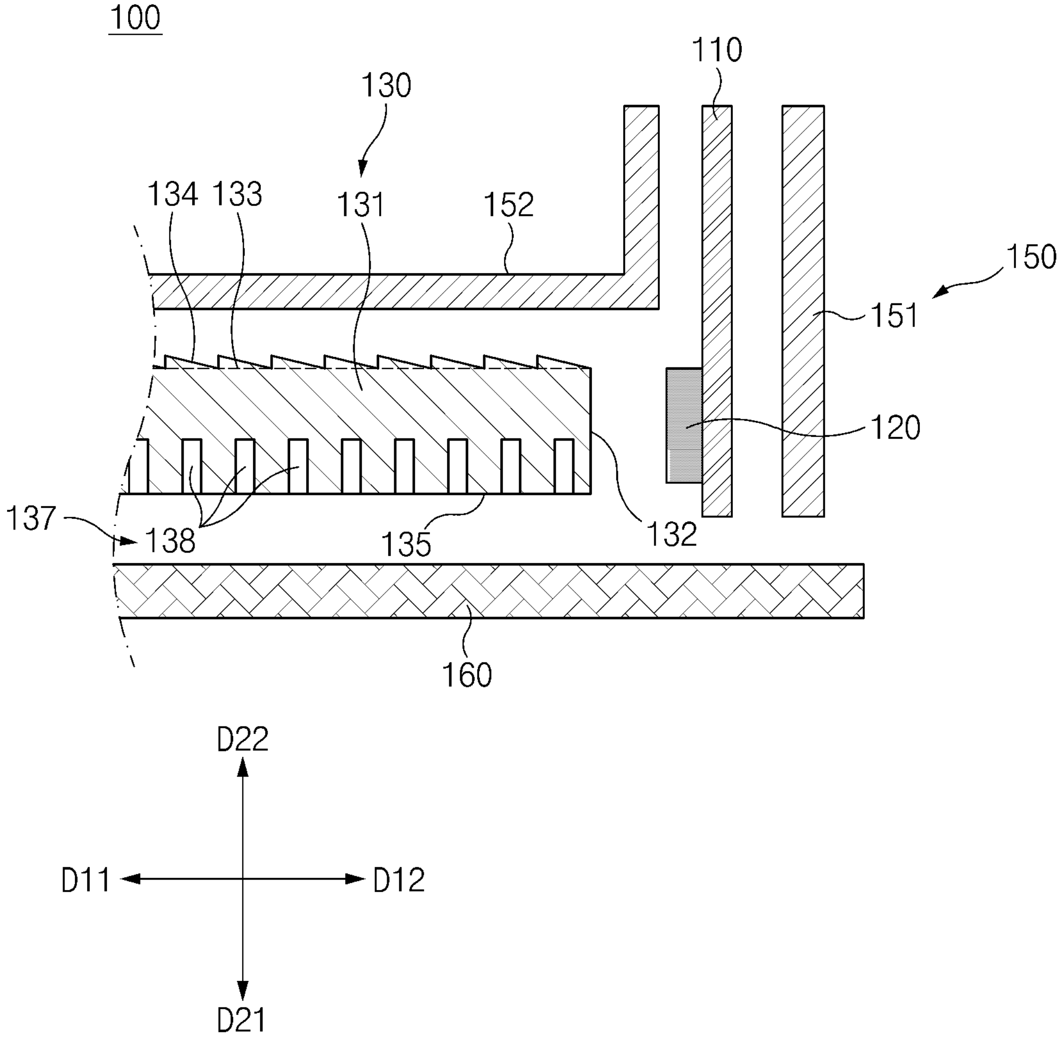
FIG. 1 is a cross-sectional view illustrating a lamp for a vehicle according to a first embodiment of the present disclosure.
Figure 2:
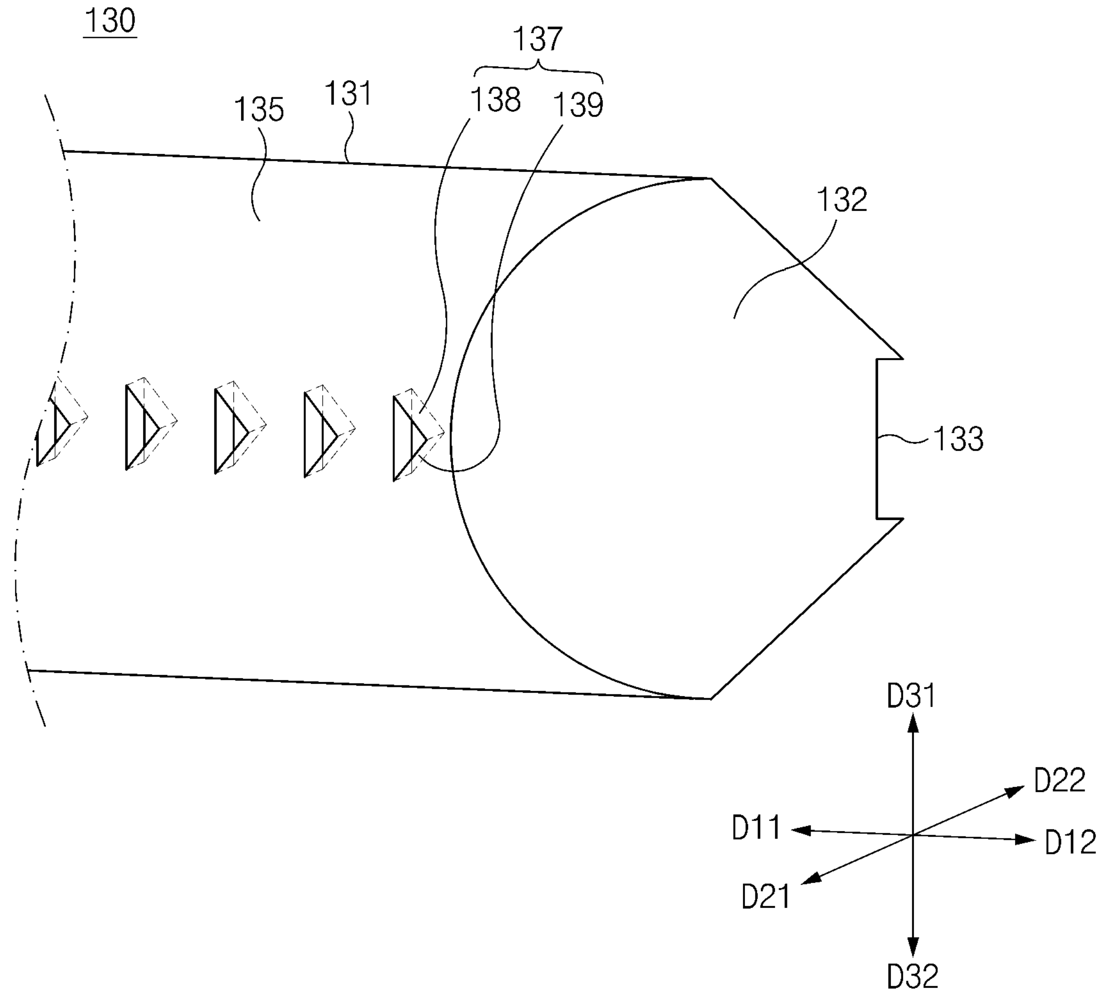
FIG. 2 is a perspective view of a light guide part according to a first embodiment of the present disclosure, viewed from a forward direction.
Figure 3:
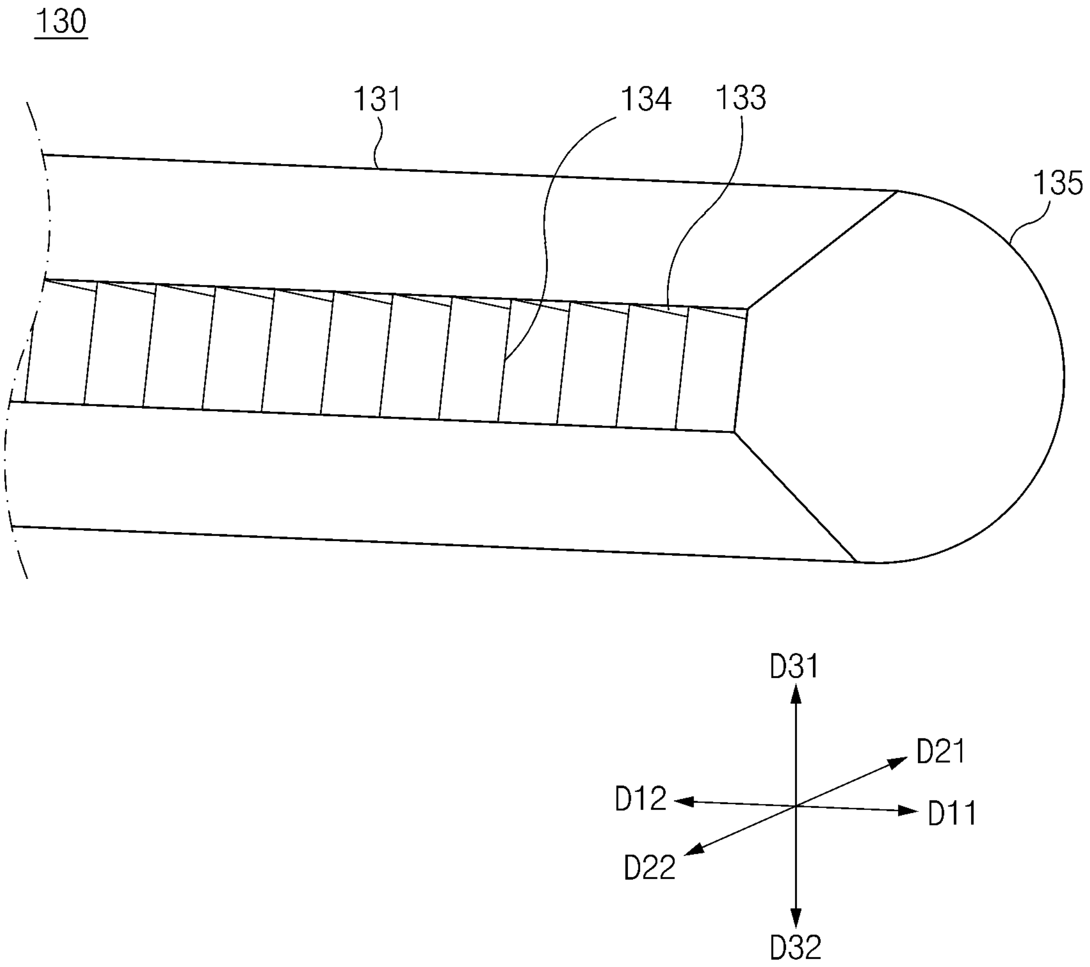
FIG. 3 is a perspective view of a light guide part according to a first embodiment of the present disclosure, viewed from a rearward direction.
Figure 4:
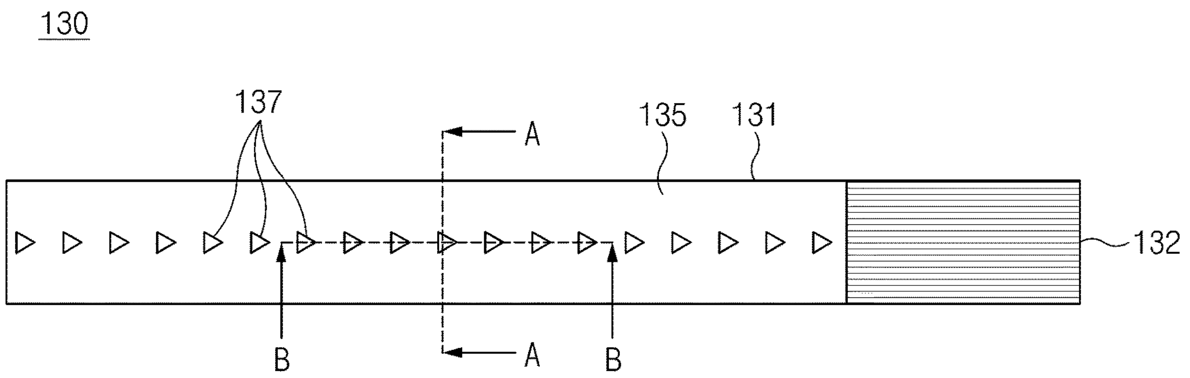
FIG. 4 is a front view of a light guide part according to a first embodiment of the present disclosure, viewed from a forward direction.
Figure 5:
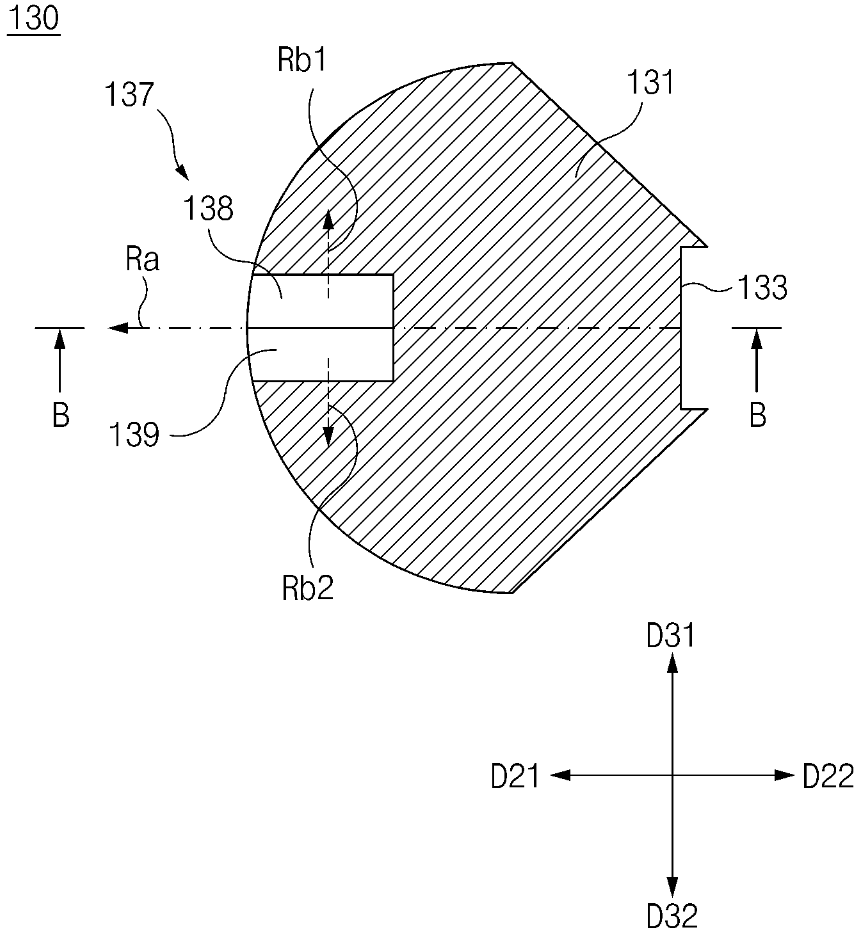
FIG. 5 illustrates a light guide part according to a first embodiment of the present disclosure, and is a cross-sectional view taken along line A-A of FIG. 4.
Figure 6:
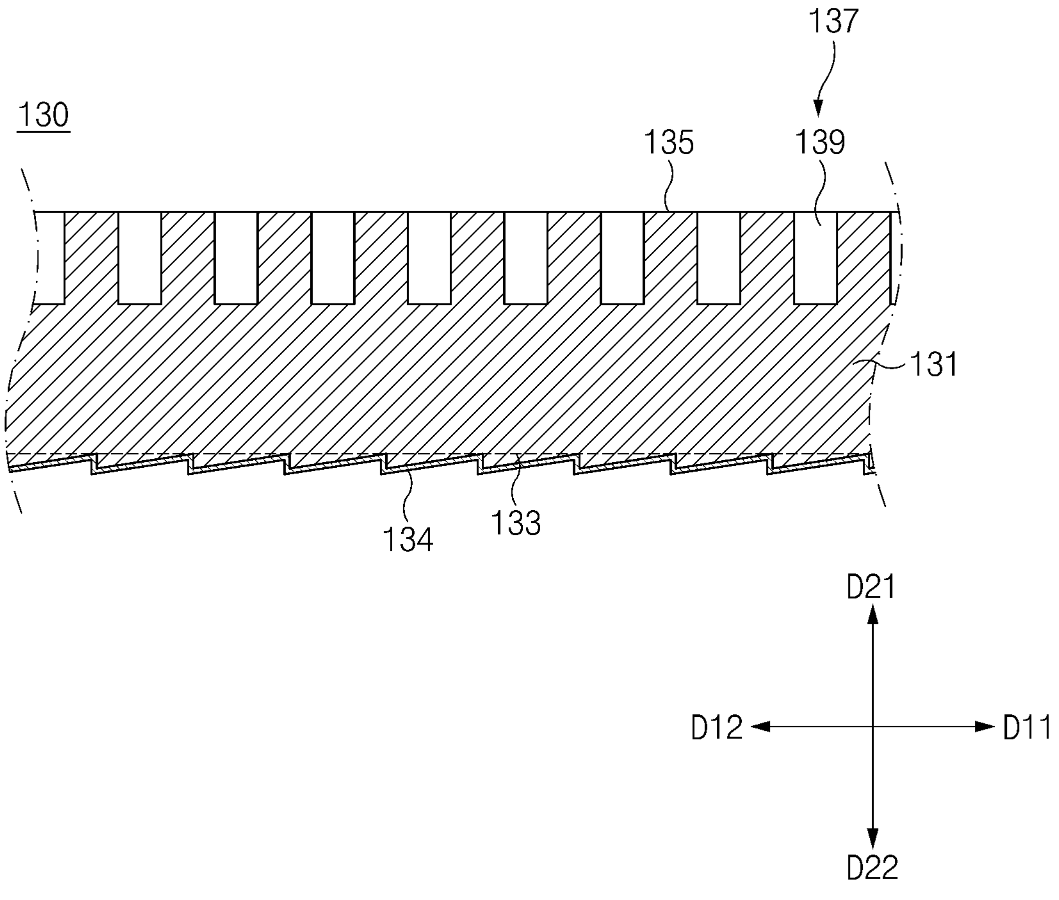
FIG. 6 illustrates a light guide part according to a first embodiment of the present disclosure, and is a cross-sectional view taken along B-B direction of FIG. 4.

FIGS. 1 to 6 illustrate a lamp for a vehicle according to a first embodiment of the present disclosure. FIG. 1 is a cross-sectional view illustrating a lamp for a vehicle according to the first embodiment of the present disclosure, FIG. 2 is a perspective view of the light guide part according to the first embodiment of the present disclosure, viewed from a forward direction, FIG. 3 is a perspective view of the light guide part according to the first embodiment of the present disclosure, viewed from a rearward direction, FIG. 4 is a front view of the light guide part according to the first embodiment of the present disclosure, viewed from the forward direction, FIG. 5 illustrates the light guide part according to the first embodiment of the present disclosure, and is a cross-sectional view taken along line A-A of FIG. 4; and FIG. 6 illustrates the light guide part according to the first embodiment of the present disclosure, and is a cross-sectional view taken along B-B direction of FIG. 4.

Referring to FIGS. 1 to 6, a lamp 100 for a vehicle according to the first embodiment of the present disclosure includes a light source part 120 and a light guide part 130. Furthermore, the lamp 100 for a vehicle according to the first embodiment of the present disclosure may further include a board part 110, a reflector part 150, and an outer lens 160.

The light source part 120 generates and emits light.

In detail, various elements or devices that may emit light may be used as the light source part 120. The light source part 120 may include a light source that generates light, and the light source, for example, may be a light emitting diode (LED).

The light guide part 130 is configured to guide and output light that is input from the light source part 120. In detail, the light guide part 130 may be configured to guide the light input from the light source part 120 through total reflection or to output the light in a forward direction D21.

For example, the light guide part 130 may be formed to extend in one direction. In the specification, for convenience of description, directions, in which the light guide part 130 extends, is defined as main extension directions D11 and D12. The light source part 120 may be disposed at one end of the light guide part 130 in the main extension directions D11 and D12. The light irradiated from the light source part 120 may be totally reflected in an interior of the light guide part 130 to be output in the forward direction D21, or may be transmitted to an opposite end D12 thereof in the main extension directions.

The light guide part 130 includes a guide body 131, an input surface 132, a reflective surface 133, an output surface 135, and a 3-dimensional light forming pattern.

The guide body 131 defines a body of the light guide part 130, and the light emitted from the light source part 120 is input thereto. The input surface 132, the reflective surface 133, and the output surface 135 may be surfaces formed on an outer surface of the guide body 131.

The input surface 132 is a surface that is provided on one side of the guide body 131, and to which light is input. The light input from the light source part 120 through the input surface 132 may be guided in the interior of the guide body 131 through total reflection.

The reflective surface 133 may be configured to reflect the light input to the guide body 131 in the forward direction D21 that is an output direction. The output surface 135 may be an outer surface of the guide body 131, except for the input surface 132 and the reflective surface 133, and may be a surface that is configured to output the light.

As in the embodiment illustrated in detail, the light that travels in the interior of the guide body 131 may reach the reflective surface 133, be reflected, and then be output through the output surface 135. The reflective surface 133 may be formed in a predetermined shape and may be configured to mainly face a rearward direction D22 that is an opposite direction to the forward direction D21, and the output surface 135 may be a surface, except for the input surface 132 and the reflective surface 133, and be formed to mainly face the forward direction D21. Shapes of the reflective surface 133 and the output surface 135 are not limited to the illustrated embodiment.

A 3-dimensional light forming pattern is formed on the guide body 131. Furthermore, the 3-dimensional light forming pattern may be formed to reflect the light input to the guide body 131 in a direction that is different from a direction of light Ra reflected by the reflective surface 133.

For example, the 3-dimensional light forming pattern may be formed to be recessed in the output surface 135 of the guide body 131, and may be formed in a predetermined shape. Then, a partial area of the 3-dimensional light forming pattern may include a material that reflects light. When the light guided into the interior of the guide body 131 reaches the 3-dimensional light forming pattern, it may be reflected and be output through the output surface 135.

Then, a direction, in which the light Rb1 and Rb2 that has reached the 3-dimensional light forming pattern is reflected, may be different from a direction, in which the light Ra that has reached the reflective surface 133 is reflected. That is, the light reflected by the 3-dimensional light forming pattern may be reflected in a direction that is different from the light reflected by the reflective surface 133 (see FIGS. 1 and 5).

Here, a shape of the 3-dimensional light forming pattern is not limited as long as it may reflect light in a direction that is different from the direction of the light reflected by the reflective surface 133.

In this way, according to the lamp 100 for a vehicle according to the first embodiment of the present disclosure, because the 3-dimensional light forming pattern is formed in the light guide part 130, the light may be output in a direction, in addition to the light output direction by the reflective surface 133, whereby a light emission image having a 3-dimensional effect may be implemented.

Meanwhile, referring to FIG. 1, the board part 110 may be provided in one direction D12 of the main extension directions D11 and D12 of the light guide part 130, and the light source part 120 may be mounted.

The reflector part 150 may be configured to reflect the light irradiated from the light source part 120 or the light emitted from the light guide part 130.

In detail, the reflector part 150 may include a first reflector 151 and a second reflector 152. The first reflector 151 may be disposed to be opposite to the light guide part 130 while the board part 110 being interposed therebetween. The first reflector 151 may reflect the light irradiated from the light source part 120 and may cause it to face the light guide part 130.

The second reflector 152 may be disposed in the rearward direction D22 of the light guide part 130. The second reflector 152 may reflect the light emitted from the light guide part 130 in the rearward direction D22 and may cause it to face the forward direction D21 of the light guide part 130.

The outer lens 160 may be disposed in the forward direction D21 of the light guide part 130, the light source part 120, and the board part 110. The outer lens 160 may function as a cover for protecting internal components of the lamp 100 for a vehicle according to the present disclosure from an outside.

Referring to FIGS. 1, 3, and 6, the reflective surface 133 may include a plurality of reflective optics 134 that reflect the light input into the guide body 131 in the forward direction D21.

Furthermore, the plurality of reflective optics 134 may be repeatedly formed along the main extension directions D11 and D12 that are directions, in which the guide body 131 extends. Hereinafter, the directions, in which the guide body 131 extends, are defined as the main extension directions D11 and D12, and an imaginary line obtained by extending a center of the guide body 131 along the main extension directions D11 and D12 is defined as a central axis.

In detail, the reflective optics 134 may be formed in a shape of fine protrusions on the reflective surface 133, and may be repeatedly formed along the main extension directions D11 and D12. The reflective surface 133 is mainly formed on the surface that faces the rearward direction D22, and the reflective optics 134 reflect the light input to the guide body 131 and guide it toward the forward direction D21.

The 3-dimensional light forming pattern may include a plurality of unit optical patterns 137. Furthermore, the plurality of unit optical patterns 137 may be formed to be spaced apart from each other along the main extension directions D11 and D12. Here, a size and the number of unit optical patterns 137 may be changed depending on a design of a lighting image.

The unit optical patterns 137 may be formed concavely on the output surface 135. Furthermore, the unit optical patterns 137 may include inclined guide surfaces 138 and 139 that are inclined with respect to an imaginary plane that is perpendicular to the central axis and are configured to reflect the light.

Here, the light Rb1 and Rb2 reflected by the inclined guide surfaces 138 and 139 may be configured to travel in a direction that is parallel to a direction that is perpendicular to a radial direction, a center of which is a central axis CL. That is, the light reflected by the inclined guide surfaces 138 and 139 may travel in a direction that is perpendicular to the radial direction with respect to the central axis of the guide body 131.

In this way, the light output from the light guide part 130 by the inclined guide surfaces 138 and 139 formed on the unit optical pattern 137 may include light that is reflected in the forward direction D21 by the reflective surface 133, and light that is reflected in a direction, other than the forward direction D21, by the inclined guide surfaces 138 and 139. As a result, the lamp 100 for a vehicle may implement a light emission image having a three-dimensional effect. By designing the pattern while varying locations and sizes of the unit optical patterns 137 and angles of the inclined guide surfaces 138 and 139, it may be designed to have various three-dimensional light emission images.

Meanwhile, according to the first embodiment of the present disclosure, the unit optical patterns 137 may be formed in the forward direction D21 of the central axis, and the plurality of unit optical patterns 137 may be formed to be spaced apart from each other along the main extension directions D11 and D12. Furthermore, the light reflected by the inclined guide surfaces 138 and 139 may be reflected in a direction that is perpendicular to the forward direction D21 and the main extension directions D11 and D12.

In detail, referring to FIG. 5, in the light guide part 130 according to the first embodiment of the present disclosure, on a cross section of the guide body 131, the unit optical pattern 137 may be formed at a center of the output surface 135 in the forward direction D21. Furthermore, the inclined guide surfaces 138 and 139 may be configured to output the light in an upward direction D31 or a downward direction D32.

For example, the unit optical pattern 137 may be formed in a recessed shape on the output surface 135, the recessed shape may be formed in a triangular prism shape, and lateral surfaces of the triangular prism may be the inclined guide surfaces 138 and 139. In this case, when the light guide part 130 is viewed from a front side, the unit optical pattern 137 may have a triangular shape (see FIGS. 2 and 4). Furthermore, on a cross section that is perpendicular to the central axis of the light guide part 130, the inclined guide surface 138 facing the upward direction D31 and the inclined guide surface 139 facing the downward direction D32 of the unit optical pattern 137 may be viewed as rectangular shapes.

Furthermore, referring to FIG. 6, the plurality of unit optical patterns 137 according to the first embodiment of the present disclosure may have the same depth in the direction that faces the central axis. However, the plurality of unit optical patterns 137 are not limited to having the same depth, and may be formed to have various depths to form various light emission images.

Figure 7:
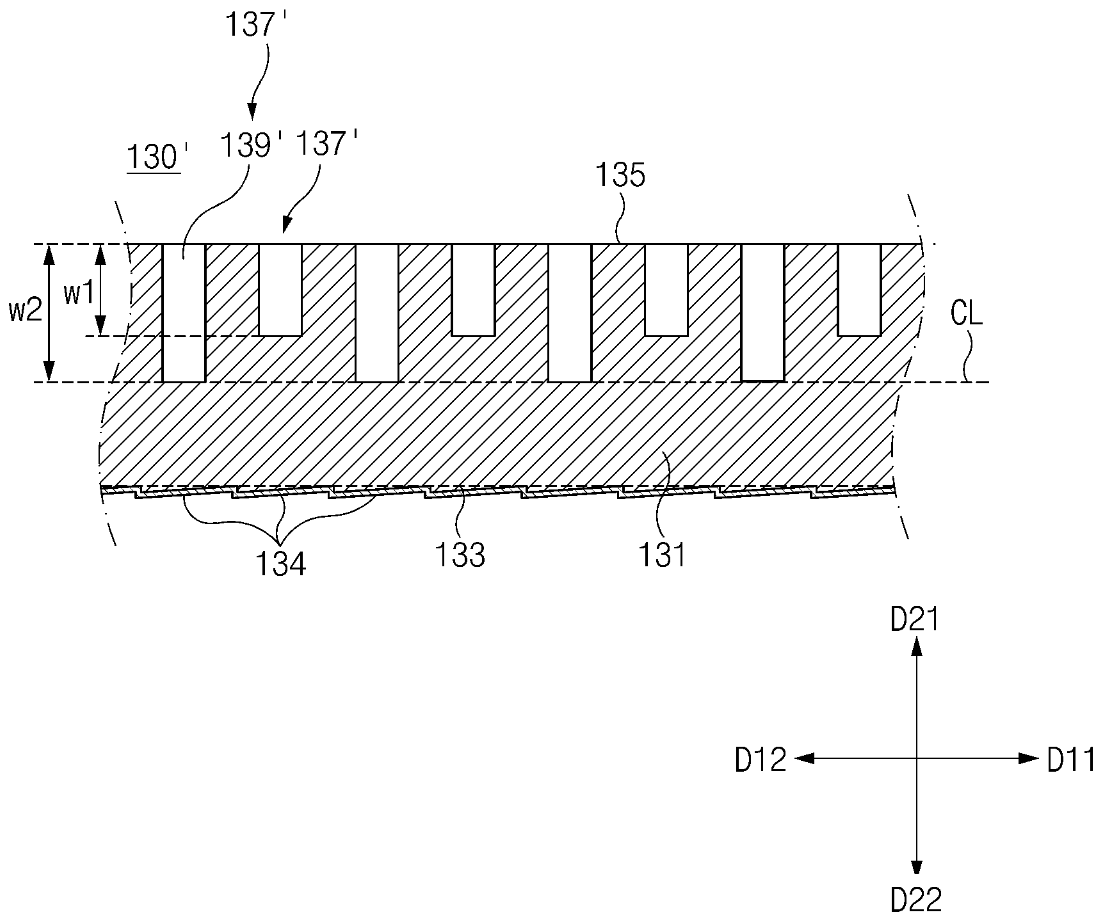
FIG. 7 is a cross-sectional view illustrating a light guide part according to a modified example of a first embodiment of the present disclosure.

For example, FIG. 7 illustrates a light guide part 130' according to a modified example of the first embodiment of the present disclosure. Referring to the 3-dimensional light forming pattern according to the modified example of the first embodiment of the present disclosure, depths of adjacent ones 137' of the plurality of unit optical patterns 137' in the direction that faces the central axis CL may be formed differently.

In detail, a depth w1 of any one of the adjacent unit optical patterns 137' in the direction facing the central axis may be smaller than a depth w2 of the other thereof in the direction facing the central axis. Furthermore, this shape may be repeated. Reference numeral 139' in FIG. 7, which is not described, denotes an inclined guide surface that is provided in the unit optical pattern 137'.

Due to the shapes of the plurality of unit optical patterns 137', the second embodiment of the present disclosure may implement a more various and 3-dimensional light emission image as compared to the above-described first embodiment.

Second Embodiment

Figure 8:
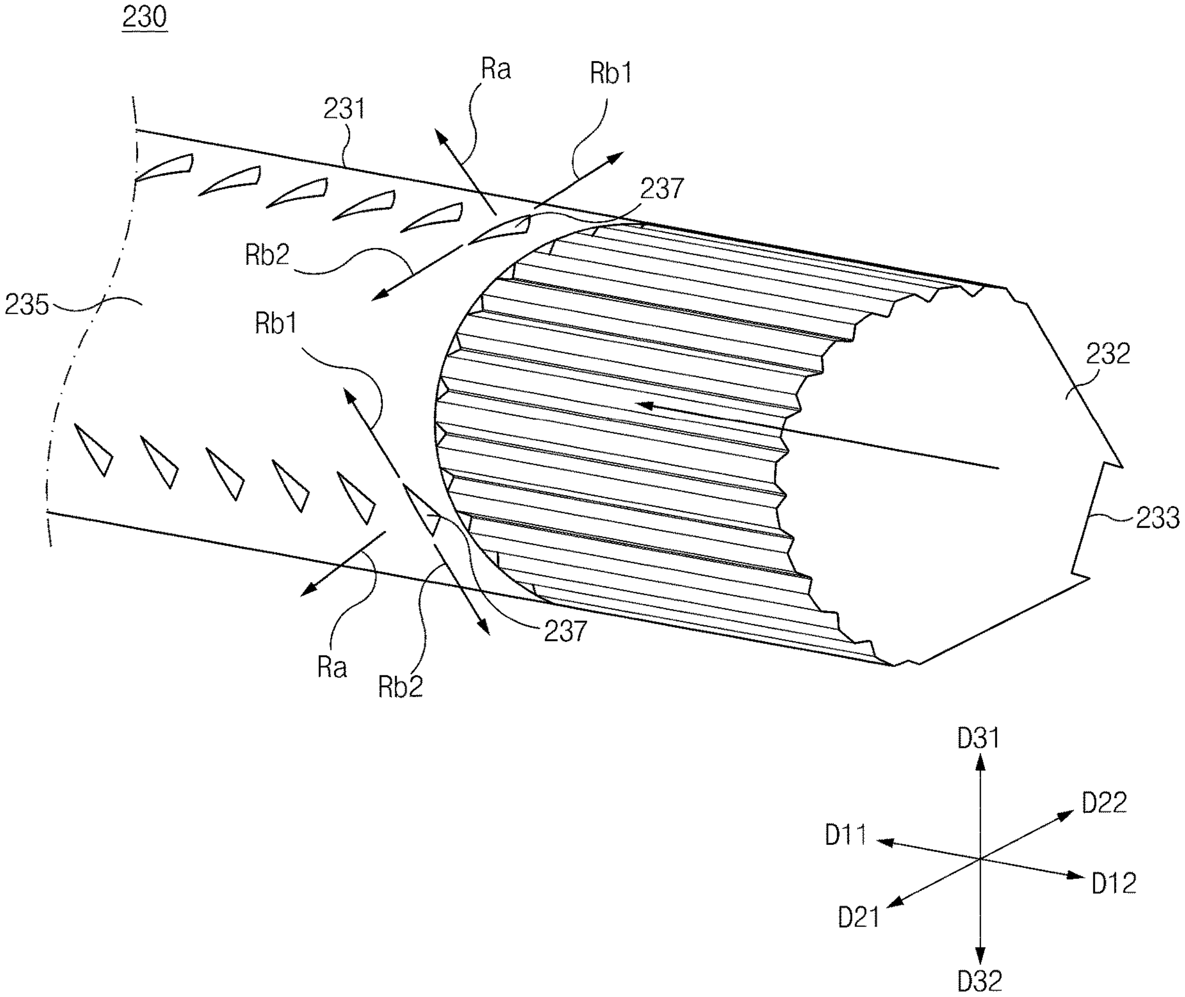
FIG. 8 is a perspective view illustrating a light guide part according to a second embodiment of the present disclosure.
Figure 9:
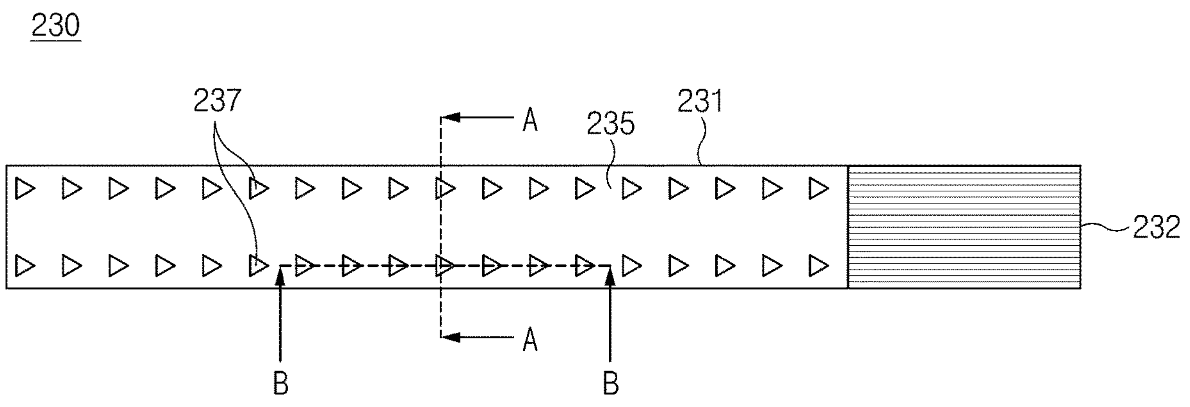
FIG. 9 is a front view of a light guide part according to a second embodiment of the present disclosure, viewed from a forward direction.
Figure 10:
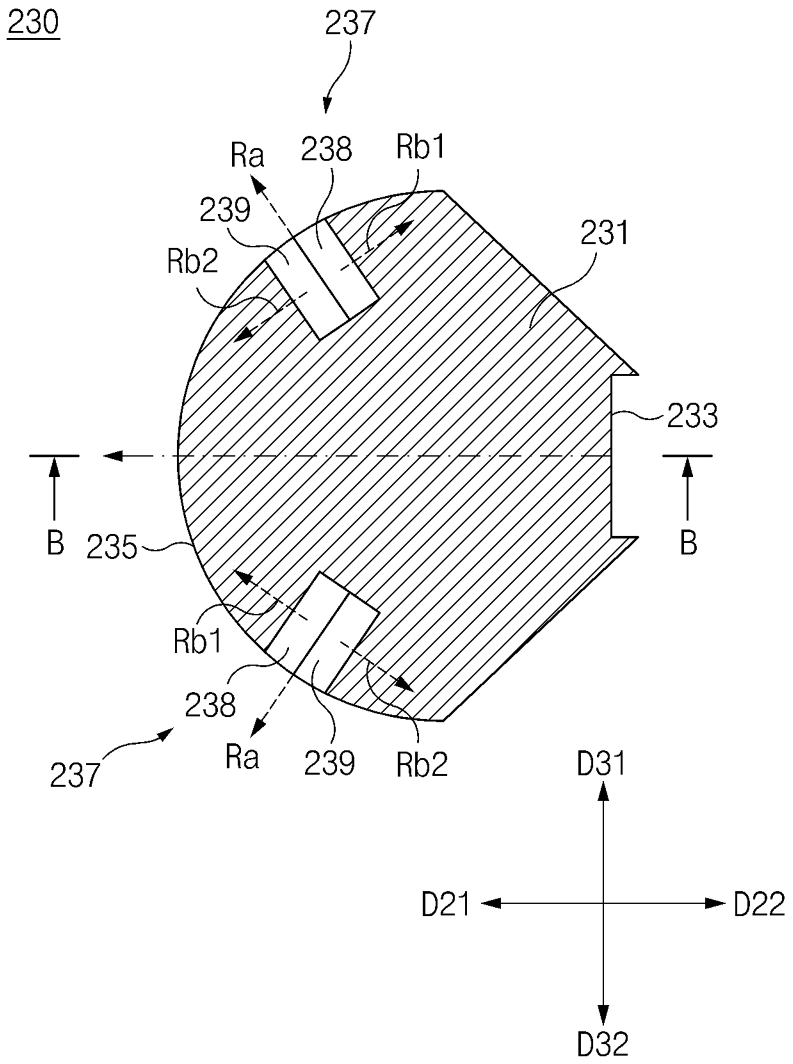
FIG. 10 illustrates a light guide part according to a second embodiment of the present disclosure, and is a cross-sectional view, taken along line A-A of FIG. 9.

Meanwhile, a light guide part 230 according to the second embodiment of the present disclosure will be described below with reference to FIGS. 8 to 10 hereinafter. FIG. 8 is a perspective view illustrating the light guide part according to the second embodiment of the present disclosure, FIG. 9 is a front view of the light guide part according to the second embodiment of the present disclosure, viewed from the forward direction D21, and FIG. 10 illustrates the light guide part according to the second embodiment of the present disclosure, and is a cross-sectional view, taken along line A-A of FIG. 9.

The light guide part 230 according to the second embodiment of the present disclosure is different in the number and the disposition of 3-dimensional light forming patterns as compared to the above-described first embodiment. The lamp 100 for a vehicle according to the second embodiment of the present disclosure may include the components of the lamp 100 for a vehicle according to the first embodiment described above, except for the differences. Hereinafter, a repeated description of the same components as the above-described components will be omitted.

The light guide part 230 according to the second embodiment of the present disclosure may include a guide body 231, an input surface 232, a reflective surface 233, an output surface 235, and a 3-dimensional light forming pattern. The 3-dimensional light forming pattern according to the second embodiment of the present disclosure may include an optical pattern set that is repeatedly formed along the main extension directions D11 and D12. Furthermore, the optical pattern set may include a plurality of unit optical patterns 237 that are spaced apart from each other along a circumferential direction of the output surface 235.

For example, one light distribution pattern set may include two unit optical patterns 237 that are spaced apart from each other in a circumferential direction on the output surface 235. Furthermore, the optical pattern set may be repeatedly disposed along the main extension directions D11 and D12. The 3-dimensional light forming pattern according to the second embodiment of the present disclosure may include a plurality of optical pattern sets.

Referring to FIGS. 8 and 10, the light input to the guide body 231 is totally reflected in the interior of the guide body 231 to be emitted on the output surface 235 (Ra) or to be reflected on the unit optical pattern 237 (Rb1*b* and Rb2). A shape of the unit optical pattern 237 may be the same as that of the unit optical pattern 137 according to the above-described first embodiment, but may be formed differently only in the disposition and the number thereof. That is, the unit optical pattern 237 may include inclined guide surfaces 238 and 239 that are formed to be inclined with respect to a plane that is perpendicular to the central axis, and the light that has reached the inclined guide surfaces 238 and 239 may travel in a different direction from that of the light output by the reflective surface 233. As an example, as in the illustrated embodiment, when the output surface 235 includes a curved surface, the light Ra that is input to the guide body 231 and reflected in a normal direction on the reflective surface 233 may be output from the output surface 235. Furthermore, the light Rb1 and Rb2 that is input to the guide body 231 and reflected by the inclined guide surfaces 238 and 239 may be output in a tangential direction from the output surface 235. However, shapes of the output surface 235 and the inclined guide surfaces 238 and 239 are not limited thereto, and a direction of the output light may be changed depending on the shapes of the output surface 235 and the inclined guide surfaces 238 and 239.

Third Embodiment

Figure 11:
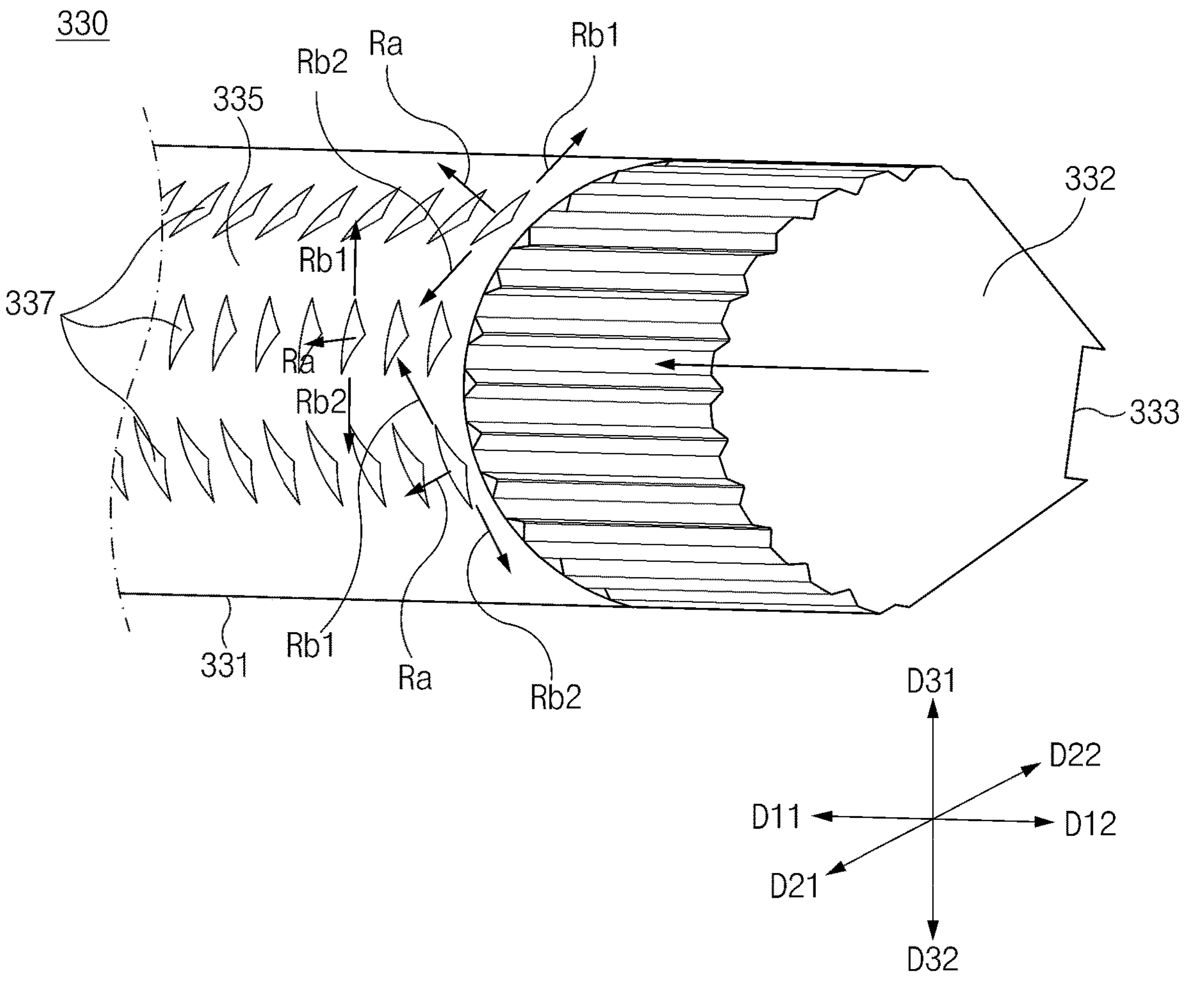
FIG. 11 is a perspective view illustrating a light guide part according to a third embodiment of the present disclosure.
Figure 12:
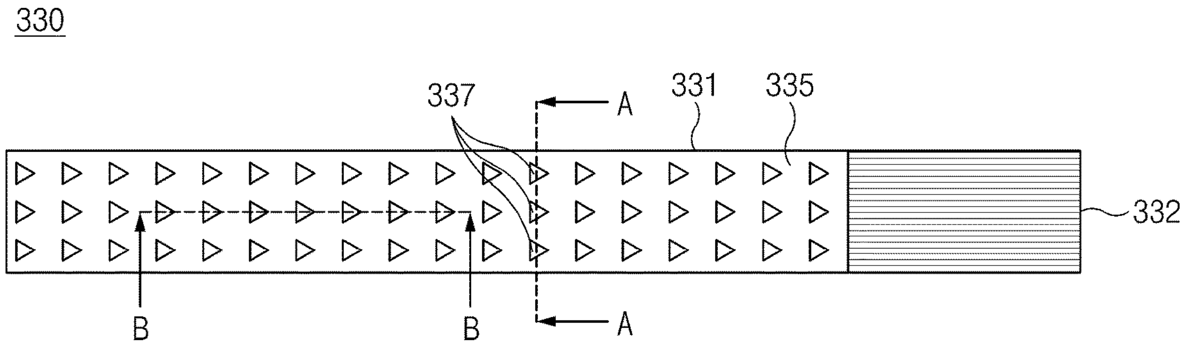
FIG. 12 is a front view of a light guide part according to a third embodiment of the present disclosure, viewed from a forward direction.
Figure 13:
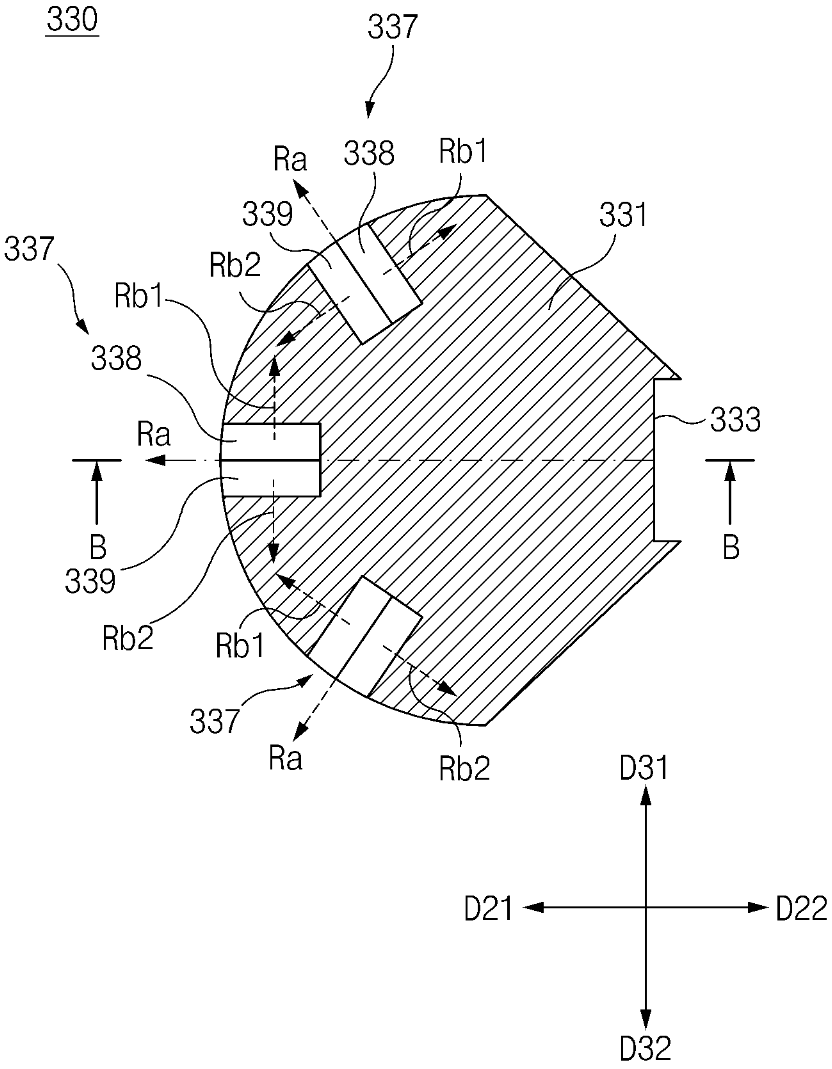
FIG. 13 illustrates a light guide part according to a third embodiment of the present disclosure, and is a cross-sectional view taken along line A-A of FIG. 12.
Figure 14:
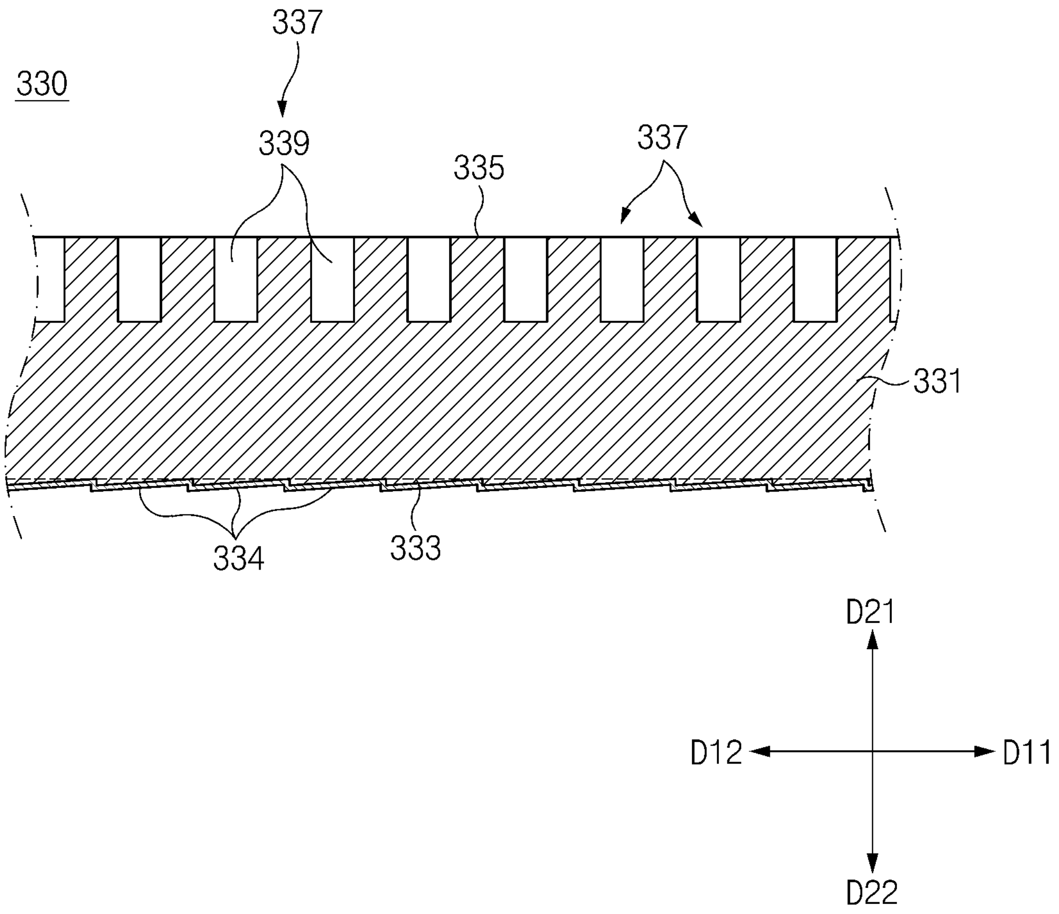
FIG. 14 is a cross-sectional view of a light guide part according to a third embodiment of the present disclosure, and is a cross-sectional view taken along line B-B of FIG. 12.

Meanwhile, FIGS. 11 to 14 illustrate a light guide part 330 according to the third embodiment of the present disclosure. FIG. 11 is a perspective view illustrating the light guide part according to the third embodiment of the present disclosure, FIG. 12 is a front view of the light guide part according to the third embodiment of the present disclosure, viewed from the forward direction D21, FIG. 13 illustrates the light guide part according to the third embodiment of the present disclosure, and is a cross-sectional view taken along line A-A of FIG. 12, and FIG. 14 is a cross-sectional view of the light guide part according to the third embodiment of the present disclosure, and is a cross-sectional view taken along line B-B of FIG. 12.

The light guide part 330 according to a third embodiment of the present disclosure is different in the number and the disposition of 3-dimensional light forming patterns as compared to the above-described second embodiment, and the light guide part 330 according to the third embodiment of the present disclosure is different from the above-described second embodiment, except for the configuration of the light guide part 230. Hereinafter, a repeated description of the same components as the above-mentioned components will be omitted.

The light guide part 330 according to the third embodiment of the present disclosure may include a guide body 331, an input surface 332, a reflective surface 333, an output surface 335, and a 3-dimensional light forming pattern. The 3-dimensional light forming pattern according to the third embodiment of the present disclosure may include an optical pattern set that is repeatedly formed along the main extension directions D11 and D12. Furthermore, the optical pattern set may include a plurality of unit optical patterns 337 that are spaced apart from each other along a circumferential direction of the output surface 335.

For example, one light distribution pattern set may include three unit optical patterns 337 that are spaced apart from each other in the circumferential direction on the output surface 335. By using the light guide part 330 according to the third embodiment of the present disclosure, a more three-dimensional and complex light emission image as compared to the above-described first and second embodiments may be implemented. The unit optical patterns 337 may include inclined guide surfaces 338 and 339 that are similar to the inclined surfaces 138 and 139.

Fourth Embodiment

Figure 15:
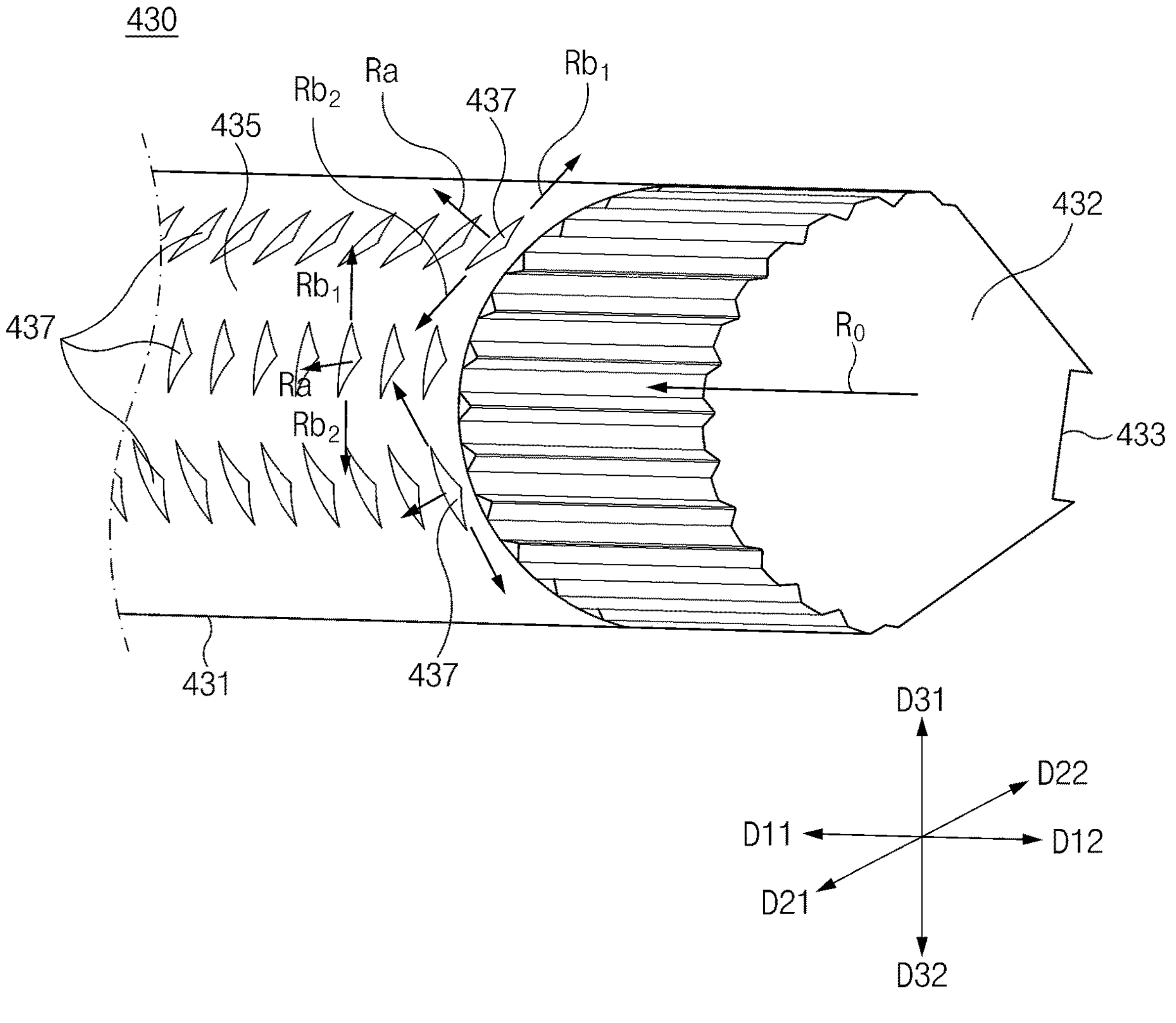
FIG. 15 is a perspective view illustrating a light guide part according to a fourth embodiment of the present disclosure.
Figure 16:
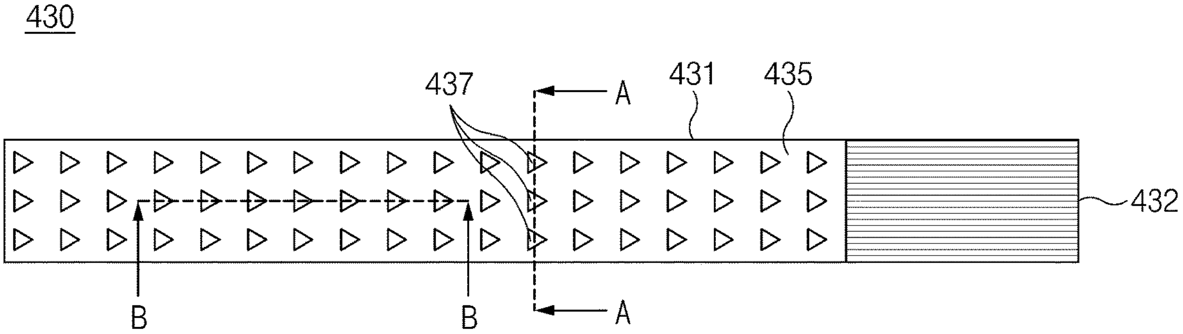
FIG. 16 is a front view of a light guide part according to a fourth embodiment of the present disclosure, viewed from a forward direction.
Figure 17:
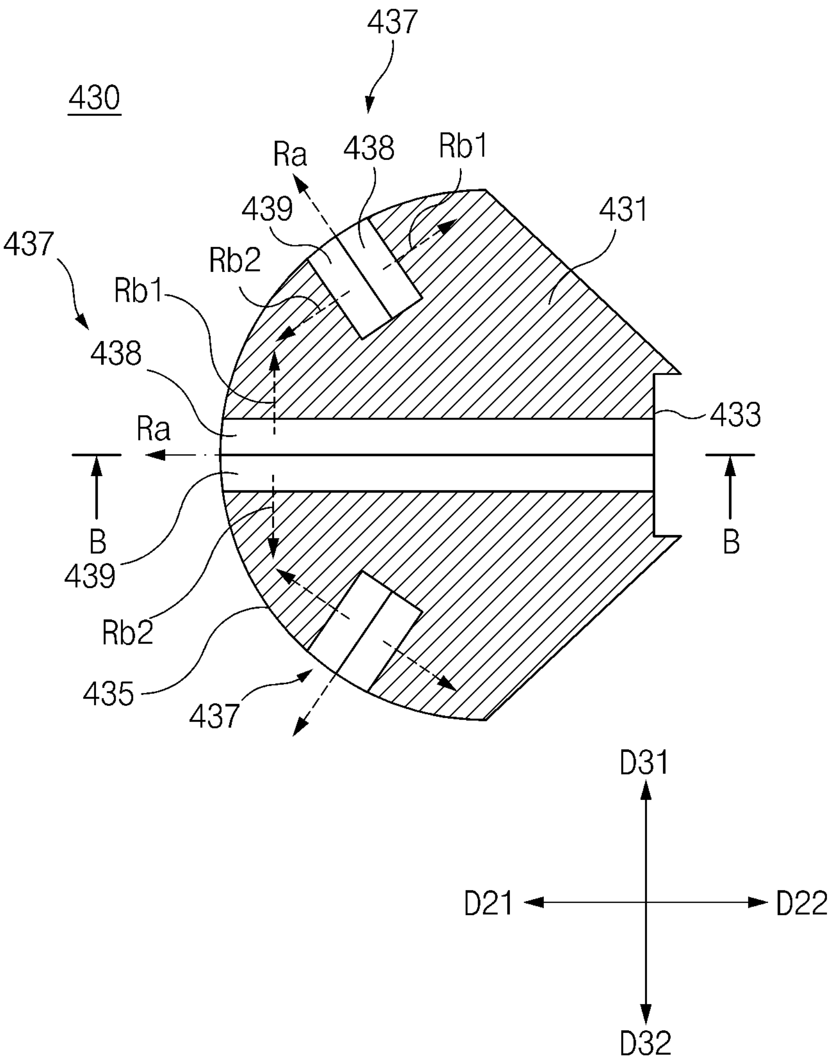
FIG. 17 illustrates a light guide part according to a fourth embodiment of the present disclosure, and is a cross-sectional view, taken along line A-A of FIG. 16.
Figure 18:
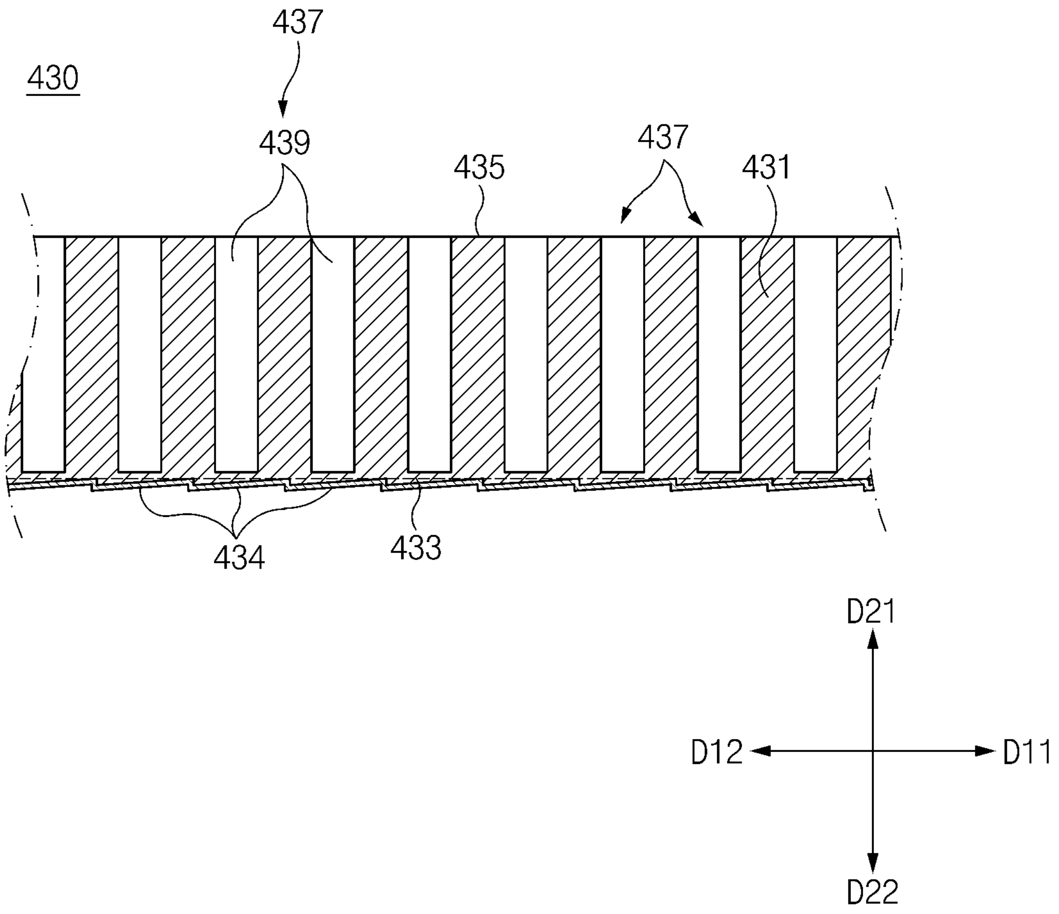
FIG. 18 is a cross-sectional view of a light guide part according to a fourth embodiment of the present disclosure, and is a cross-sectional view taken along line B-B of FIG. 16.

Meanwhile, a light guide part 430 according to a fourth embodiment of the present disclosure will be described below with reference to FIGS. 15 to 18. FIG. 15 is a perspective view illustrating the light guide part according to the fourth embodiment of the present disclosure, FIG. 16 is a front view of the light guide part according to the fourth embodiment of the present disclosure, viewed from the forward direction D21, FIG. 17 illustrates the light guide part according to the fourth embodiment of the present disclosure, and is a cross-sectional view, taken along line A-A of FIG. 16, and FIG. 18 is a cross-sectional view of the light guide part according to the fourth embodiment of the present disclosure, and is a cross-sectional view taken along line B-B of FIG. 16.

The light guide part 430 according to the fourth embodiment of the present disclosure is different in a shape of the 3-dimensional light forming pattern as compared to the above-described third embodiment. Except for these differences, a lamp 400 for a vehicle according to the fourth embodiment of the present disclosure may include the components of the lamp 400 for a vehicle according to the above-described third embodiment. Hereinafter, a repeated description of the same components as the above-described components will be omitted.

The light guide part 430 according to the fourth embodiment of the present disclosure may include a guide body 431, an input surface 432, a reflective surface 433, an output surface 435, and a 3-dimensional light forming pattern. The 3-dimensional light forming pattern according to the fourth embodiment of the present disclosure may include an optical pattern set that is repeatedly formed along main extension directions D11 and D12. Furthermore, the optical pattern set may include a plurality of unit optical patterns 437 that are spaced apart from each other along a circumferential direction of the output surface 435.

Furthermore, one of the plurality of unit optical patterns 437 may be formed in the forward direction D21 of the central axis and extend from the output surface 435 to the reflective surface 433. In other words, at least one of the plurality of unit optical patterns 437 provided in one optical pattern set may be formed in a different size from the other unit optical patterns 437.

For example, one optical pattern set may include three unit optical patterns 437 that are spaced apart from each other in a circumferential direction on the output surface 435. Furthermore, with reference to FIG. 16, the unit optical pattern 437 disposed at the center of the optical pattern set may extend long from the output surface 435 to the reflective surface 433. Due to this shape, amounts of the lights reflected from the unit optical patterns 437 provided in the optical pattern set may be different, and accordingly, more various forms of light emission images may be implemented.

However, the fourth embodiment of the present disclosure is not limited to the above-described description and the illustrated embodiment, and may be modified into various shapes as long as sizes of some of the unit optical patterns 437 included in one optical pattern set may be formed differently. The unit optical patterns 437 may include inclined guide surfaces 438 and 439 that are similar to the inclined surfaces 138, 139.

Fifth Embodiment

Figure 19:
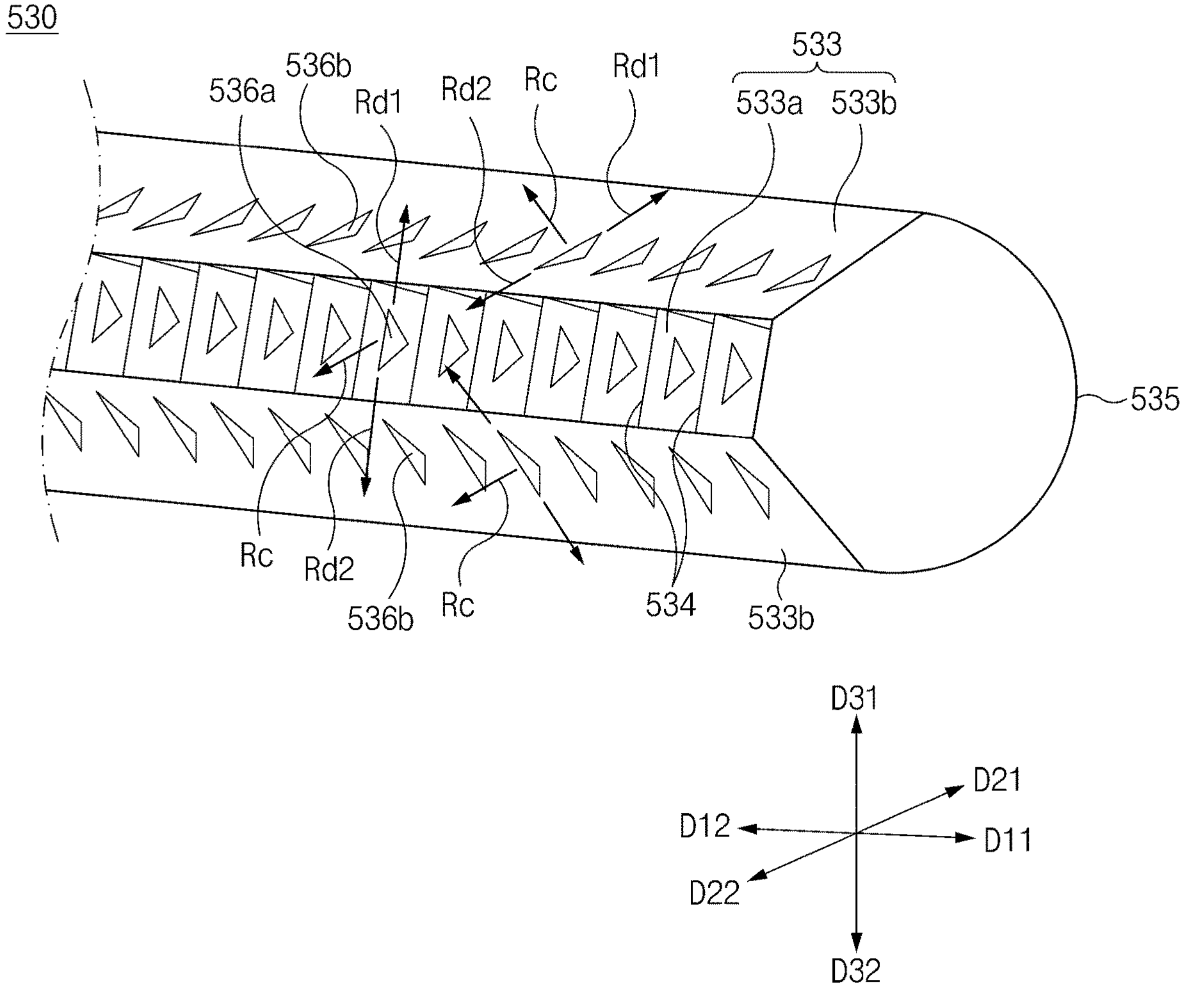
FIG. 19 is a perspective view illustrating a light guide part according to a fifth embodiment of the present disclosure.
Figure 20:
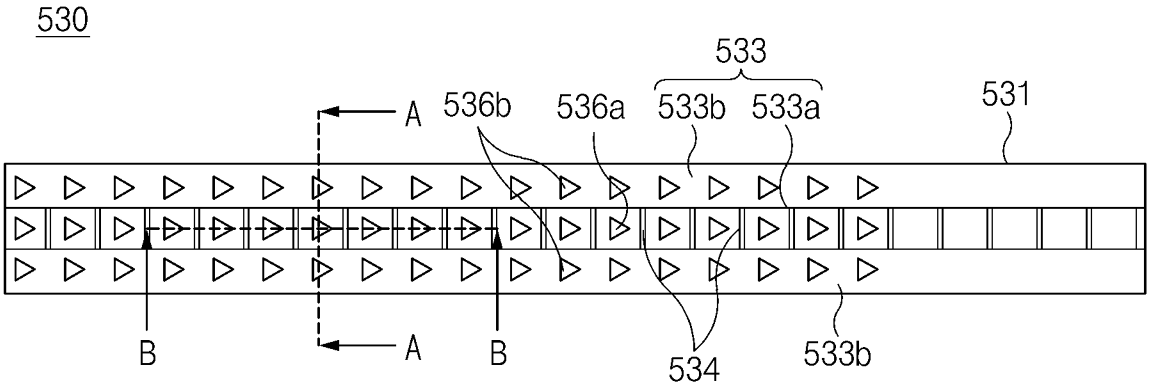
FIG. 20 is a rear view of a light guide part according to a fifth embodiment of the present disclosure, viewed from the rearward direction.
Figure 21:
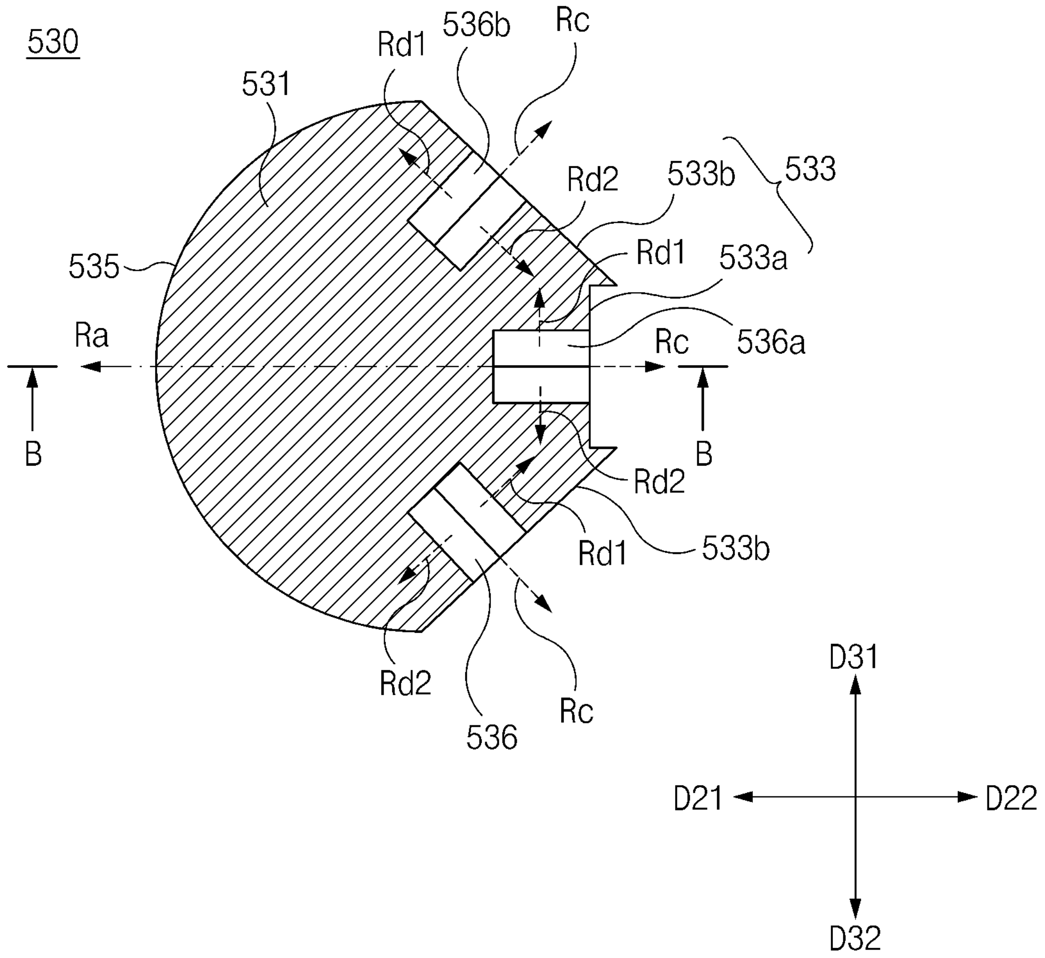
FIG. 21 illustrates a light guide part according to a fifth embodiment of the present disclosure, and is a cross-sectional view taken along line A-A of FIG. 20.
Figure 22:
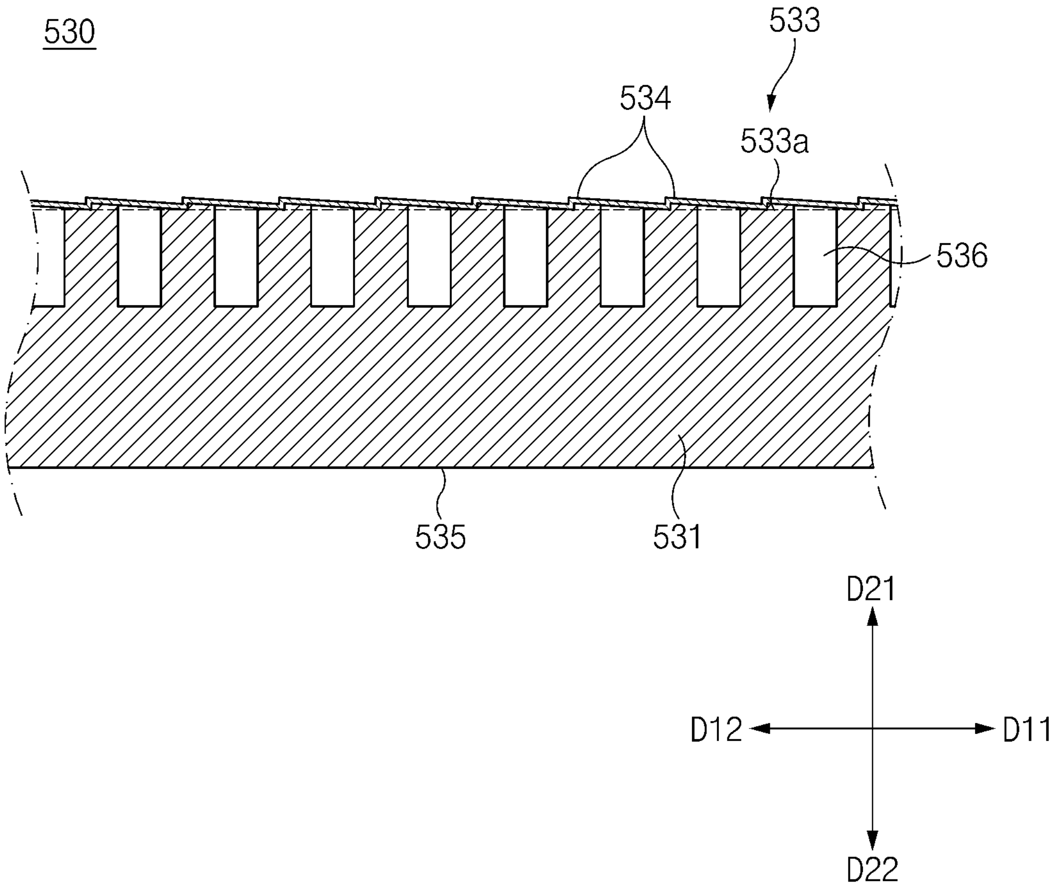
FIG. 22 is a cross-sectional view of a light guide part according to a fourth embodiment of the present disclosure, and is a cross-sectional view taken along line B-B of FIG. 20.

Meanwhile, a light guide part 530 according to a fifth embodiment of the present disclosure will be described below with reference to FIGS. 19 to 22. FIG. 19 is a perspective view illustrating the light guide part according to the fifth embodiment of the present disclosure, FIG. 20 is a rear view of the light guide part according to the fifth embodiment of the present disclosure, viewed from the rearward direction, FIG. 21 illustrates the light guide part according to the fifth embodiment of the present disclosure, and is a cross-sectional view taken along line A-A of FIG. 20, and FIG. 22 is a cross-sectional view of the light guide part according to the fourth embodiment of the present disclosure, and is a cross-sectional view taken along line B-B of FIG. 20.

The light guide part 530 according to the fifth embodiment of the present disclosure differs from the above-described first to fourth embodiments in that a multi-light forming pattern is formed on a reflective surface 533. Except for these differences, the light guide part 530 according to the fifth embodiment of the present disclosure may include all the configurations of the light guide part 530 according to the above-described first to fourth embodiments. For example, although not illustrated, a 3-dimensional light forming pattern may be formed on an output surface 535. Hereinafter, a repeated description of the same components as the above-described components will be omitted.

The light guide part 530 according to the fifth embodiment of the present disclosure may include a guide body 531, an input surface 532, the reflective surface 533, the output surface 535, and a multi-light forming pattern.

The reflective surface 533 may include a first reflective surface 533*a* that is formed to face the rearward direction D22 that is opposite to the forward direction D21, and a second reflective surface 533*b* that is formed to be inclined with respect to the first reflective surface 533*a*.

For example, as in the illustrated embodiment, the reflective surface 533 may include the first reflective surface 533*a* that is formed vertically and a pair of second reflective surfaces 533*b* that extend from an upper end and a lower end of the first reflective surface 533*a* toward the forward direction D21. There is no limit in an angle between the first reflective surface 533*a* and the second reflective surface 533*b* and a variation may be made depending on a design specifications of the light guide part 530. Here, the light emission image may be changed depending on sizes and angles of the first reflective surface 533*a* and the second reflective surface 533*b*.

The multi-light forming pattern may include a plurality of multi-pattern sets that are repeated along an extension direction of the guide body 531. Furthermore, the multi-pattern set may include a first unit multi-pattern 536*a* that is formed on the first reflective surface 533*a* and a second unit multi-pattern 536*b* that is formed on the second reflective surface 533*b*.

In more detail, the multi-light forming pattern is intended to form multi-light by reflecting light at a point that is adjacent to the reflective surface 533, and like the 3-dimensional light forming pattern, is a configuration that gives a three-dimensional effect to the light emission image. A more three-dimensional light emission image may be implemented by implementing light that is output in various directions not only in the forward direction D21 of the light guide part 530 but also in the rearward direction D22 by using the multi-light forming pattern.

For example, a multi-pattern set may include the first unit multi-pattern 536*a* that is formed on the first reflective surface 533*a*, and two second unit multi-patterns 536*b* that are formed on a pair of second reflective surfaces 533*b*. Furthermore, the multi-pattern set may be disposed repeatedly along the main extension directions D11 and D12. The multi-light forming pattern according to the fifth embodiment of the present disclosure may include a plurality of multi-pattern sets.

Referring to FIGS. 19 and 21, the light that is input to the guide body 531 is totally reflected in an interior of the guide body 531, and may be output from the output surface 535 (Ra) or the reflective surface 533 (Rc). Alternatively, the light that is input to the guide body 531 may be reflected and output from the first unit multi-pattern 536*a* or the second unit multi-pattern 536*b* (Rd1 and Rd2). The light Rc output from the reflective surface 533 may be reflected in the forward direction D21 by a reflector part 550 disposed in the rearward direction D22 of the light guide part 530.

For example, the first unit multi-pattern 536*a* or the second unit multi-pattern 536*b* may have a shape that is similar to that of a unit optical pattern 537. That is, the first unit multi-pattern 536*a* and the second unit multi-pattern 536*b* may include an inclined surface that is formed to be inclined with respect to a plane that is perpendicular to the central axis. The light that has reached the inclined surface may travel in a different direction from the light that is totally reflected by an internal structure of the guide body 531. However, a shape of the first unit multi-pattern 536*a* or the second unit multi-pattern 536*b* is not limited to the above-described embodiment.

Furthermore, referring to FIG. 22, the plurality of first unit multi-patterns 536*a* according to the fifth embodiment of the present disclosure may be formed to have the same depth in the direction facing the central axis. However, the plurality of first unit multi-patterns 536*a* are not limited to having the same depth, and may be formed to have various depths.

Figure 23:
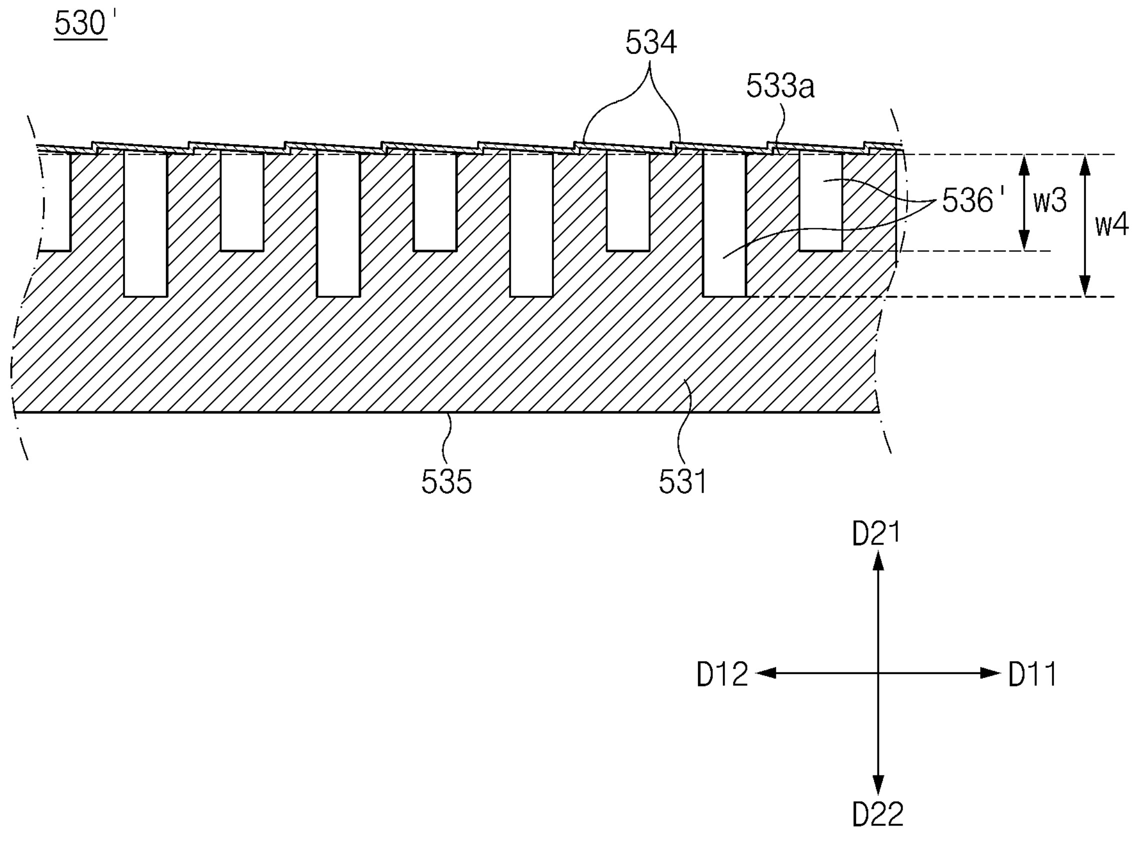
FIG. 23 is a cross-sectional view illustrating a light guide part according to a modified example of a fifth embodiment of the present disclosure.

For example, FIG. 23 illustrates a light guide part 530' according to a modified example of the fifth embodiment of the present disclosure. According to the modified example of the fifth embodiment of the present disclosure, a multi-light forming pattern may include a plurality of first unit multi patterns 536' that are formed on the first reflective surface 533*a* and are spaced apart from each other along an extension direction of the guide body 531.

Furthermore, adjacent first unit multi-patterns 536' of the plurality of first unit multi-patterns 536' may have different depths in a direction facing a center of the guide body 531.

In detail, a depth w3 in a direction facing a central axis of any one of the adjacent first unit multi-patterns 536' may be formed to be smaller than a depth w4 in a direction facing a central axis of the other one. Furthermore, this shape may be repeated.

Due to the shape of the plurality of first unit multi-patterns 536', the modified example of the fifth embodiment of the present disclosure may implement a more various and three-dimensional light emission image as compared to the above-described fifth embodiment.

According to the lamp for a vehicle according to the example of the present disclosure, a 3-dimensional light forming pattern may be formed on the light guide part whereby a light emission image having a three-dimensional effect may be implemented by irradiating light in a direction, in addition to a direction of irradiation of light by the reflective surface.

Although the specific embodiments of the present disclosure have been described in detail above, the spirit and scope of the present disclosure are not limited to these specific embodiments, and various modifications and variations may be made by an ordinary person in the art, to which the present disclosure pertains, while not changing the essence of the present disclosure described in the claims.

What is claimed is:

1. A lamp for a vehicle, the lamp comprising:
a light source part configured to emit light; and
a light guide part configured to guide the light input from the light source part and output the light,
wherein the light guide part includes:
a guide body, to which the light irradiated from the light source part is input;
an input surface, to which the light provided on one side of the guide body is input;
a reflective surface configured to reflect the light input to the guide body in a forward direction being an output direction;
an output surface being a surface of an outer surface of the guide body, except for the input surface and the reflective surface, the output surface configured to output the light; and
a 3-dimensional light forming pattern formed to be recessed in the output surface of the guide body, and
wherein the 3-dimensional light forming pattern is formed to reflect the light input to the guide body in a different direction from a direction of the light reflected by the reflective surface,
wherein the output surface includes a forwardly convex curved surface,
wherein, when directions in which the guide body extends are defined as main extension directions, and a line obtained by extending a center of the guide body along the main extension directions is defined as a central axis, the 3-dimensional light forming pattern includes a plurality of unit optical patterns,
wherein the unit optical pattern is formed on the output surface to be concave,
wherein the 3-dimensional light forming pattern includes a plurality of sets of optical patterns repeatedly formed along the main extension directions,
wherein each of the plurality of sets of the optical patterns includes the plurality of unit optical patterns, which are formed to be spaced apart from each other along a circumferential direction of the output surface,
wherein each unit optical pattern includes an inclined guide surface configured to reflect light in a direction orthogonal to both the forward direction and the main extension direction, and
wherein the plurality of unit optical patterns are configured to collectively generate a three-dimensional light emission image with varying light intensity across the convex output surface, thereby creating a depth-perceived lighting effect for visual enhancement.

2. The lamp of claim 1,
wherein the reflective surface includes a plurality of reflective optics configured to reflect the light input to an interior of the guide body in the forward direction,
wherein the reflective optics are repeatedly formed along main extension directions, in which the guide body extends, and
wherein the reflective optics are configured to cooperate with the inclined guide surfaces of the unit optical patterns to enhance a directional contrast between forward-emitted and orthogonally-reflected light to produce a three-dimensional lighting effect.

3. The lamp of claim 1,
wherein the unit optical pattern includes an inclined guide surface formed to be inclined with respect to an imaginary plane being perpendicular to the central axis and is configured to reflect the light, and
wherein the light reflected by the inclined guide surface travels in a direction parallel to a direction perpendicular to a radial direction, a center of which is the central axis, thereby contributing to the three-dimensional visual effect across the convex output surface.

4. The lamp of claim 3,
wherein the plurality of unit optical patterns are formed in the forward direction of the central axis, along the main extension directions to be spaced apart from each other, and
wherein the light reflected by the inclined guide surface is reflected in a direction perpendicular to the forward direction and the main extension directions, to generate a visually distinguishable 3D light emission image when viewed from a frontal angle.

5. The lamp of claim 4, wherein the plurality of unit optical patterns are formed such that depths thereof in a direction facing the central axis are the same to produce a uniform three-dimensional lighting effect with consistent optical intensity across the output surface.

6. The lamp of claim 4, wherein adjacent ones of the plurality of unit optical patterns are formed such that depths thereof in a direction facing the central axis are different, thereby generating a varying depth profile that enhances the perceived three- dimensionality of the light emission image.

7. The lamp of claim 1, wherein any one of the plurality of unit optical patterns is formed in the forward direction of the central axis, and extends from the output surface to the reflective surface, such that the optical pattern contributes to both orthogonal and forward light guidance for composite visual depth.

8. The lamp of claim 1,
wherein the reflective surface includes a first reflective surface formed to face a rearward direction being an opposite direction to the forward direction, and a second reflective surface formed to be inclined with respect to the first reflective surface,
wherein the light guide part further includes a multi-light forming pattern,
wherein the multi-light forming pattern includes a plurality of multi-pattern sets repeated along an extension direction of the guide body, and
wherein the multi-pattern set includes a first unit multi-pattern formed on the first reflective surface, and a second unit multi-pattern formed on the second reflective surface, each contributing to complex light emission patterns that complement the three-dimensional visual effect created by the output surface.

9. The lamp of claim 1,
wherein the light guide part further includes a multi-light forming pattern,
wherein the reflective surface includes a first reflective surface formed to face a rearward direction being an opposite direction to the forward direction,
wherein the multi-light forming pattern includes a plurality of unit multi-patterns formed on the first reflective surface and spaced apart from each other along an extension direction of the guide body, and wherein adjacent ones of the plurality of first unit multi-patterns are formed such that depths thereof in a direction facing a center of the guide body are different, to induce light gradient variations that reinforce the overall three-dimensional lighting effect.

10. The lamp of claim 1, further comprising:

an outer lens, wherein the 3-dimensional light forming pattern comprises a plurality of unit optical patterns arranged along the length of the guide body and configured to emit light toward the outer lens, the outer lens being positioned to diffuse and enhance the orthogonally reflected light to maximize the three-dimensional image output.

11. The lamp of claim 10, wherein the light forming pattern emits light externally through the outer lens, with the emitted light forming a visually dynamic 3D image based on internal redirection angles and output surface curvature.

12. The lamp of claim 10, wherein the outer lens comprises a cover for protecting internal components of the lamp, while also serving as an optical interface that maintains the intended three-dimensional lighting projection geometry.

* * * * *